Oct. 17, 1961     E. P. WENZELBERGER     3,004,397
METHOD AND APPARATUS FOR DEHYDRATION
Filed April 17, 1958     2 Sheets-Sheet 1

INVENTOR
ELWOOD P. WENZELBERGER

BY

ATTORNEYS

Oct. 17, 1961     E. P. WENZELBERGER     3,004,397
METHOD AND APPARATUS FOR DEHYDRATION
Filed April 17, 1958     2 Sheets-Sheet 2
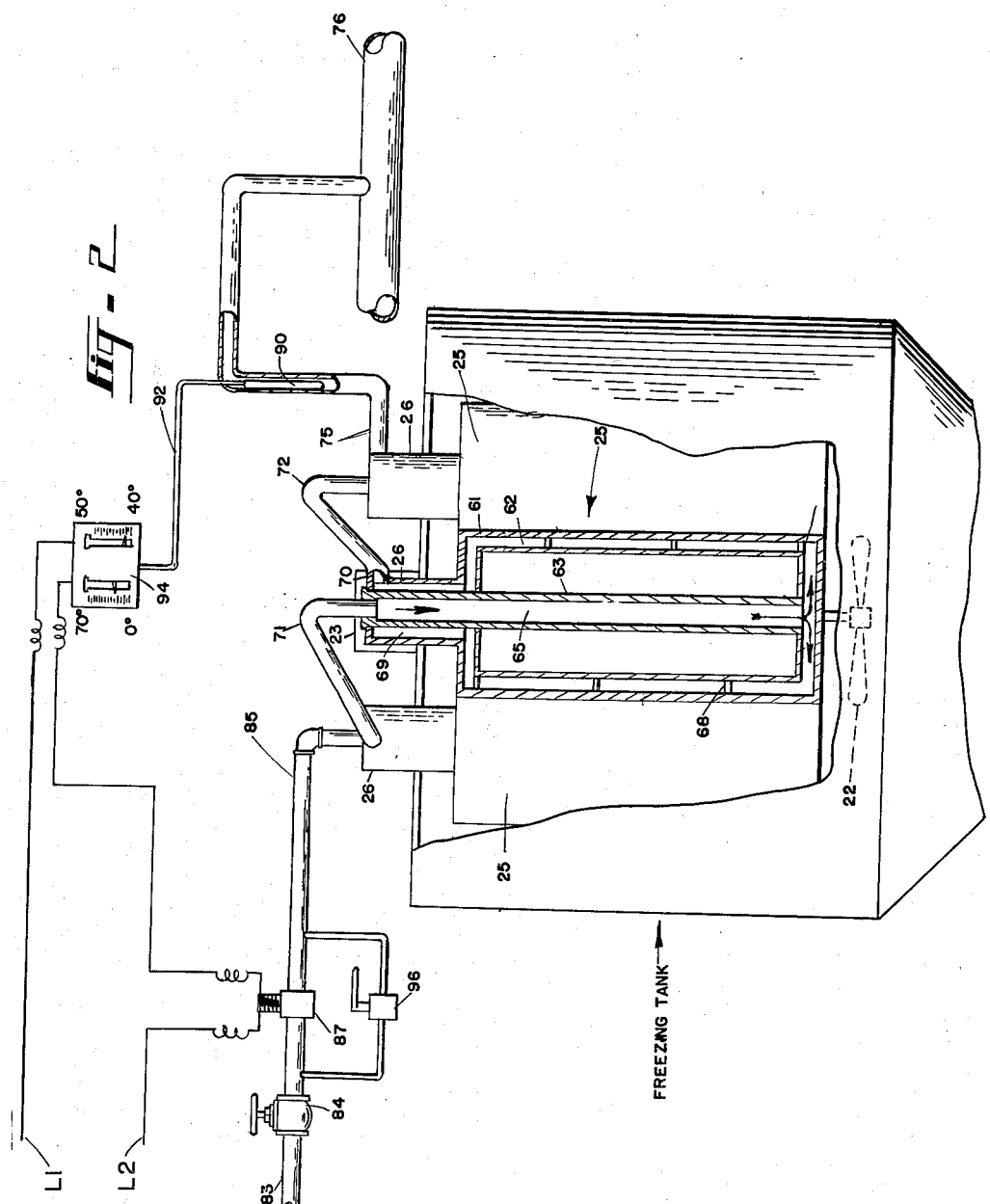
INVENTOR
ELWOOD P. WENZELBERGER
BY *Toulmin & Toulmin*
ATTORNEY

United States Patent Office 3,004,397
Patented Oct. 17, 1961

3,004,397
METHOD AND APPARATUS FOR DEHYDRATION
Elwood P. Wenzelberger, Newburgh, N.Y., assignor, by mesne assignments, to Union Carbide Corporation, a corporation of New York
Filed Apr. 17, 1958, Ser. No. 730,746
5 Claims. (Cl. 62—123)

This application is a continuation-in-part of Serial No. 380,021, filed September 14, 1953 and now abandoned.

This invention relates to a method and apparatus for dehydrating liquids and aqueous suspensions by freezing out of the water as ice crystals. The invention is especially useful in the dehydration of substances which are heat-sensitive, such as vegetable and fruit juices, milk, beverages and the like.

It is one of the objects of the invention to provide a process and apparatus for carrying out dehydration by freezing, utilizing a series of refrigerating steps or stages wherein small differential temperatures are used to transform the water present into finely divided ice crystals during each stage of treatment, the ice crystals being removed to produce a final concentrate which is substantially water-free and of the desired consistency of Brix.

It is another object of this invention to provide a simplified method and apparatus for accomplishing dehydration by freezing and wherein it is possible to reduce the number of freezing cylinders and the associated driving mechanism and utilize a freezing concentrator containing only one moving member.

Another object of the invention is to provide a simplified method and apparatus for carrying out a series of freezing dehydrating treatments wherein the freeze cycles can be held to approximately twenty minute cycles and utilizing a more simplified system than has been suggested heretofore.

It is another object of the invention to provide an improved method and apparatus wherein the overall size of the freezing tanks can be reduced for producing an equal capacity of concentrate as compared with the size of the freezing tanks used heretofore, and thus reduce the cost of constructing and operating the freezing units.

Still another object of the invention is to provide a simplified system for carrying out the freeze dehydration and utilizing a smaller number of freezing units whereby the cost of production may be reduced as much as 50% with an overall increase in efficiency and providing an improved mechanism for discharging of the ice crystals from the freezing tanks.

It is a further object of the invention to provide improved freezing units and methods for controlling the temperature.

These and other objects and advantages will become apparent from the following description taken in connection with the drawings, wherein—

FIGURE 2 is an enlarged detail view of the construction and operation of the freezing units; including mechanism for automatically controlling the temperature for the freeze tanks.

Figure 1:
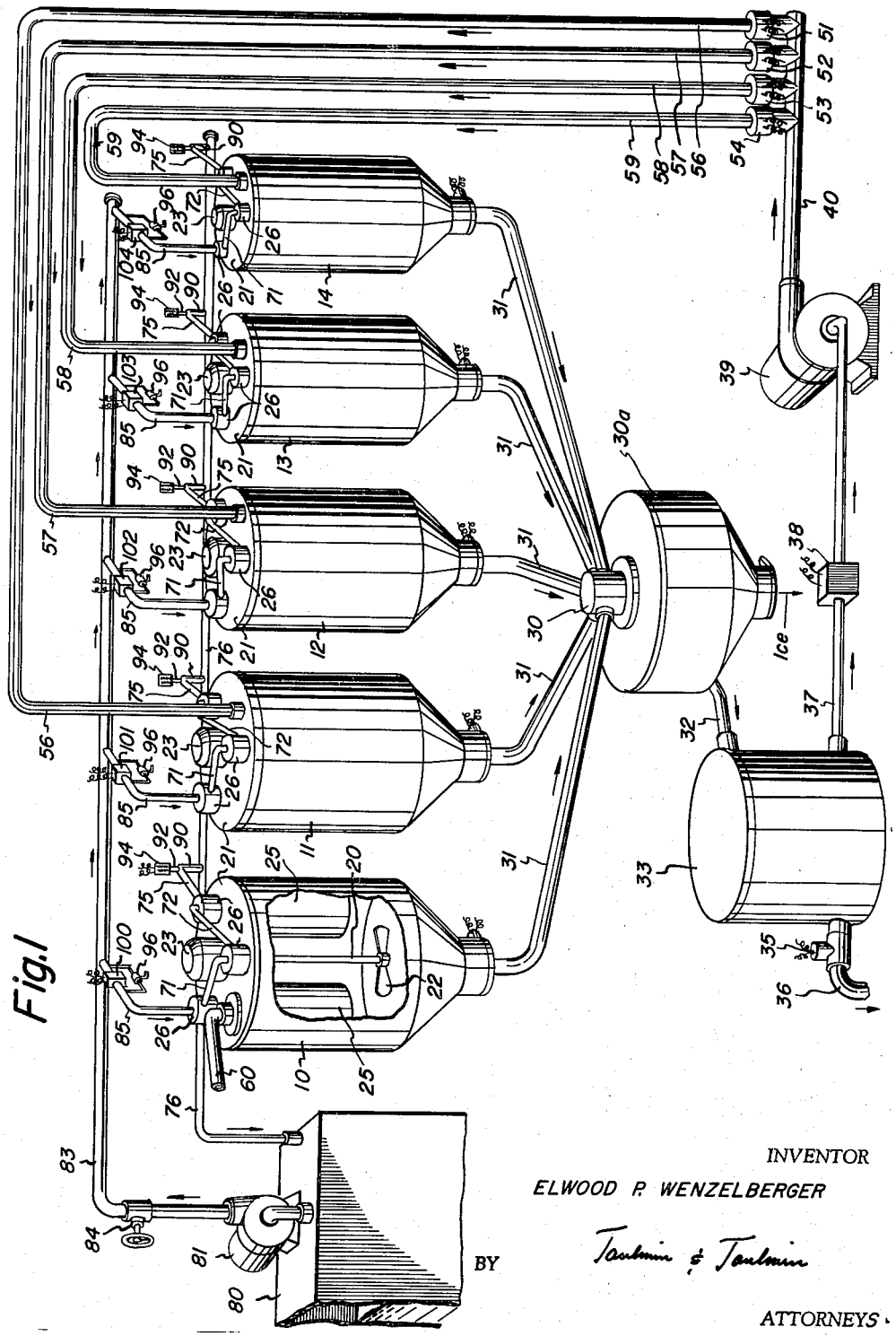
FIGURE 1 illustrates one embodiment of the invention, the same being illustrated diagrammatically in perspective.

The present invention represents a modification of the method and apparatus for dehydration of heat-sensitive liquid bearing solids as illustrated and described in my application Ser. No. 196,686, filed November 20, 1950, now United States Patent No. 2,723,539.

This invention has to do more particularly with a modified freezing system wherein use is made of hollow-wall freezing cylinders through which the refrigerant is passed, the cylinders being arranged in a freezing tank similarly as illustrated in FIGURE 1. The arrangement utilizing hollow-wall freezing cylinders in accordance with this invention makes it unnecessary to use a scraper means and its associated driving equipment in engagement with the cylinders for preventing ice crystals from accumulating thereon. The present invention thus provides a simplified apparatus and system for carrying out freeze dehydration of such liquid bearing solids.

Successive refrigeration is carried out utilizing the several freezing tanks while the temperature is maintained at successive lower ranges for each freezing treatment. The maintenance of temperatures, which are continually being lowered, causes the water to freeze as individual crystals in the mother liquor which is being agitated. Thus the crystals are readily removed by centrifuging. This makes it possible to remove the water as ice crystals with a minimum of occlusion of the juice or liquid being dehydrated.

It has also been found that by first cooling the liquid bearing solids, such as fruit juices and adjusting the difference between the temperature of the liquid and the temperature of the refrigerant by a small differential, on the order of about 5° to 7° F., and then agitating the liquid bearing the solids, preferably while seeded with ice crystals, the liquid thus treated will immediately form ice crystals throughout the body of the liquid and the temperature rises to the ice forming or congealing point. To prevent the ice crystals from occluding substantial amounts of the liquid being dehydrated and to prevent the crystals of ice from agglomerating and growing to a larger size, the solution is rapidly and continuously agitated while the temperatures are carefully controlled whereby ice crystals do not form too rapidly. This results in the production of fine ice crystals which are substantially uniformly distributed throughout the liquid being treated.

In order to obtain these fine crystals of ice in a relatively pure form without the occlusion of substantial amounts of the solids and concentrated liquid being dehydrated, the temperature of the liquid being treated must be held substantially constant, the temperature being maintained at a predetermined lower temperature in each stage of freezing treatment, this temperature being below the ice forming temperature of the solution.

Further, in order to increase the rate of formation of the ice crystals as finely divided individual particles throughout the solution or liquid being treated, the system is required to have a high heat exchange capacity. This may be brought about by first providing good agitation of the liquid which circulates the liquid rapidly in contact with the freezing surfaces of the cylinders and, secondly, by maintaining a ratio of about one square foot of cooling surfaces for each one to one and one-half gallons of solution being treated, and finally, by maintaining the flow of refrigerant sufficiently through the system to remove a relatively large quantity of heat.

It has been found important that the successive stages of the freezing treatment shall be conducted above 0° F. and it has also been found that when the successive stages of treatment are carried out at relatively small temperature differentials, such as about 5° and 7° F., the temperature of the liquid in the second stage should be approximately the temperature of the refrigerant in the first stage, etc. It will, of course, be understood that these differentials in temperature may be varied somewhat below the range given, depending upon the liquid being treated and the amount of solids in the liquid, but the principle of the operation remains generally the same.

For example, in the treatment of orange juice, the basic temperature of the juice may vary from 34° to 75° F., depending upon the amount of pre-cooling, but preferably the juice is pre-cooled to approximately 30° F. It is then introduced into the first tank for refrigeration at about 25° F., then in the second tank at 18° F., then in the third at 11° F., then in the fourth at 4° F., and finally in the last tank it is maintained at −3° F. At each freezing stage treatment ice crystals are formed which are distributed throughout the juice, resulting in the production of a slushy mass. After approximately 20 minutes treatment at this freezing temperature, no further ice crystals form and the slushy mass is transferred to a centrifuge and the ice crystals separated from the liquid, the resultant concentrated juice then pumped to the next succeeding tank and treated at a temperature differential of approximately 7° F., etc. until the end tank, the ice crystals being removed after each freezing stage treatment. By employing a multiple or series of successive freezing steps, starting with the temperature just about at the freezing point of water and progressively reducing it and removing the water by freezing at each stage, there is produced a final concentrate having the desired Brix.

Referring to the drawings in more detail, wherein like reference characters indicate like parts throughout the several views, the numerals 10, 11, 12, 13 and 14 designate refrigeration tanks, each of which are of similar construction and operation. The tanks are equipped with a stirring mechanism as shown in FIGURE 1, and in detail in the tank on the left, which is illustrated partly broken away. The stirring means comprises a rotatable shaft 20 having a propeller blade 22 suitably fixed on the lower end thereof, the drive shaft 20 extending upwardly through the cover 21 of the tank 10 and arranged to be driven by a motor 23 mounted on the top of the tank. While separate motors are shown for operating the stirring mechanism on each tank, it will be obvious that the same may be driven by a single motor employing conventional flexible driving means interconnecting the several stirrer propeller shafts.

Arranged in each refrigeration tank is a plurality of interconnected hollow cold-wall cylinders 25, preferably three being mounted in each cylinder, as illustrated in FIGURE 1 and disclosed in more detail in FIGURE 2.

The cold-wall cylinders 25 comprise an upper reduced diameter section or neck 26 through which suitable conduit connections or adapters are made to a refrigerant source for introducing the same into the refrigerating tanks and circulating the same through the hollow walls of each cylinder, as indicated by the arrows in FIGURE 2. The citrus juice being dehydrated by freezing is pumped to the first tank 10 and after being subjected to a freezing stage treatment, is discharged therefrom in the form of a slush containing fine ice crystals floating in the liquid portion of the juice. This ice-containing concentrate is discharged into a common header 30 by way of a connecting conduit 31. The ice crystals are then removed by centrifuging and the concentrated juice is drawn off through a conduit 32 to a receiver or container 33.

Concentrated juice is drawn off from the receiver 33 when desired through the electrically operated valve 35 and drain conduit 36 for storage or packing of the juice when the desired Brix or solids content is reached. For successive freezing treatments the partially dehydrated juice, as for example after a first run, is pumped from the receiver 33 into the next refrigerating tank 11 where the cycle is repeated and after discharge and separation of the ice crystals formed, the concentrate is pumped to tank 12 and finally to tank 14 for final refrigeration. The return pipe line connections are made from the receiver 33 through lines 37, electrically operated valve 38, pump 39 and conduit 40, and thence through the electrically operated valves 51, 52, 53 and 54 respectively which are connected to the conduits 56, 57, 58 and 59 respectively. Raw juice may be admitted to the first tank 10 through the conduit 60. The electrically operated valves may be of the conventional solenoid type which are actuated by contact switch connections made therewith.

As illustrated in FIGURE 2, the freezing cylinders 25 arranged in each of the refrigeration tanks 10, 11, 12, 13 and 14 are constructed and operated in like manner for each tank. As aforementioned, three freezing cylinders are employed for each tank. However, the invention is not limited to any particular number of freezing cylinders. For example, one or more may be employed for each tank, depending upon the material being treated and the number of refrigeration cycle treatments required.

The freezing cylinders 25 comprise the neck portion 26 and a cylindrical body portion 61 of double wall construction and providing a hollow space 62 for the passage of refrigerant around and adjacent the outer walls of the body portion 61. A central tube 63 is arranged in each cylinder which communicates at its lower extremity 65 with the hollow space 62 of the cold wall so that the refrigerant can flow downward through the central portion of the cylinder and upwardly through the hollow walls.

Spiral baffles 68 are arranged in the hollow space 62 to cause the refrigerant to flow uniformly around the cylinder walls and upwardly and out through the hollow wall 69 of the neck portion 26 and thence through the exit opening 70. The refrigerant is then conducted through the pipe line 71 to the second freezing cylinder and after passing downwardly and upwardly through the spirally shaped hollow walls, is discharged therefrom and conducted to the third cylinder through the conduit 72 from whence it is finally passed through the pipe line 75 and to the return line 76 which is connected to a sump tank or the like, not shown.

A refrigerant such as brine or the like is conducted from the freezing cylinder, as shown by the arrows in FIGURE 2, the same being drawn from a storage or refrigerant tank 80 by pump 81. The refrigerant delivered by pump 81 is conducted through the conduit 83 controlled by manually operated shut-off valve 84 which, in turn, is connected to the pipe line 85 which communicates with the central tube 63 of the first freezing cylinder, as illustrated in FIGURE 2.

Where the stirring mechanism does not provide sufficiently violent agitation of the juice during the freezing cycle, ice tends to collect on the outer walls of the freezing cylinders 25 and must be periodically removed otherwise it tends to form an insulating blanket around the cylinders which will inhibit the proper operation of the freeze-dehydration system. The formation of ice crystals on the outer walls of the cylinders may be effectively prevented by the use of scrapers as illustrated and described in my aforementioned copending application. These scrapers are arranged to continuously travel over the cylinder wall surfaces during the freezing cycle and thus prevent ice particles from forming thereon.

Provided it is not desired or suitable to install and operate scrapers on each of the freezing cylinders, the ice particles may be removed periodically by withdrawing refrigerant from the freezing cylinder and admitting a heated fluid, e.g., hot air, thereto to bring about substantially instantaneous warming of the surface of the cylinder which causes the ice to fall from the cylinder or permit the same to be carried away by operation of the stirrer blade 22. Prevention of ice formation on the cylinders or its periodic removal may be satisfactorily achieved by employing a number of different ways other than as described, such as for example, by using an electrical heating element for flash heating the freezing cylinder at intervals to melt or dislodge ice tending to build up on the walls of the cylinders. Thus, the spiral arranged baffles 68 in the freezing cylinders may comprise electrical resistance elements which are suitably connected to a source of electricity at pre-set intervals to heat and flash-off ice particles which tend to cling to the cylinder wall surfaces.

A magnetically operated valve generally designated 87 is arranged in the line 85 for controlling the flow of refrigerant to the several freezing cylinders. The electrical circuit for actuating valve 87 is normally closed and is set to open electrically when a predetermined low temperature is reached. The thermometer 90 disposed in the discharge line 75 of the last freezing cylinder is electrically connected through the tube 92 to the adjustable temperature controller 94. When the refrigerant temperature reaches a predetermined point, as determined by the setting of the temperature controller 94, the electrical contacts are closed between the power line source $L_1$ and $L_2$ to cause the magnetically operated valve 87 to open, thus allowing refrigerant to flow to the freezing cylinders in the several tanks. A by-pass valve 96 is arranged in the pipe line 85 which is manually operable to permit passage of refrigerant around the electrically operated valve 87 when so desired. Normally the by-pass valve 96 is set to permit a small amount of refrigerant to pass to the freezing cylinders in order to maintain a predetermined low temperature therein.

The freeze cycle for each tank treatment normally takes approximately 20 minutes where the ratio of freezing surface to solution is on the order of one square foot area of cooling surface to 1.8 gallons of citrus juice or liquid being treated. The electrically operated valves 100, 101, 102, 103 and 104 are set to permit the entry of refrigerant at a temperature approximately 3 to 5° below the temperature of the juice being refrigerated. The temperature controller 94 for each of the freezing tanks is set so that the first tank 10 is set to refrigerate the juice at a temperature of about 25° F.; tank 11 is set to refrigerate the juice at about 18° F.; tank 12 at about 11° F.; tank 13 at 4° F.; and the last tank 14 is set to refrigerate at −3° F.

The refrigerant or brine enters at a temperature equivalent to the lowest temperature in the last tank 14 or usually at about −10° F. when the magnetic valve 104 is open. The temperature controller 94 is set to operate at 25° F. for the first tank, as aforementioned. When the refrigerant or brine is at −10° F., the contacts through the thermometer 90 actuate the temperature controller which closes the valve 104. The by-pass valve 96 allows a trickle of refrigerant to maintain circulation for the thermometer and control system. The freezing cylinder then contains brine at −10° F. which extracts heat from the juice which is admitted at approximately 34° F. As this brine warms up by taking heat from the juice and reaches approximately 25° F. or a little above, the thermometer 90 again actuates the temperature controller 94 and opens the valve 100, allowing a further supply of cold brine or refrigerant to enter the freezing cylinders to extract more heat from the juice.

This continues in this manner intermittently until the juice and ice mixture have attained a temperature of approximately 25° F. or a little above. Then no more cold brine can enter the freezing cylinder of this tank unless, by radiation or otherwise, the temperature of the system rises. When this happens, enough brine is allowed to enter to correct this change of temperature and we now have the system operating at a temperature equilibrium at 25° F. When the liquid juice is thus maintained under this equilibrium refrigerating condition at approximately 25° F., the liquid juice arrives at such a concentration that no further ice crystals are formed and the juice is ready to be discharged therefrom. The walls of the freezing cylinders are maintained by the temperature controller at approximately 25° F.

After this cycle of refrigeration in the first tank has been completed and the juice discharged therefrom and the ice separated from the mother liquor or concentrated juice, the resultant mother juice is pumped to the second freezing tank, etc. and the temperature equilibrium maintained at 18° F., 11° F., 4° F. and −3° F. in the last tank, as aforementtioned. It has been found that a differential temperature of approximately 5 to 7° F. between the refrigerant and the freezing solution in each tank gives about the maximum amount of ice crystals and of the proper fineness of crystals. It has been observed that if the differential temperatures are considerably wider than this, although the freezing of the juice can be accomplished at a greater speed, the advantages are offset by the disadvantage that juice and solids are occluded in the ice crystals which is not desired.

An example of a preferred method of carrying out the invention, and as applied specifically to orange juice, is as follows—

Starting with 12 gallons of orange juice two lots were processed to obtain a 60° plus Brix juice. The original juice had the following analysis:

| | |
|---|---|
| Brix | 12.3 |
| Oil percent | 0.005 |
| Sugar, acid ratio | 12.93:1 |

Yield—about 2 quarts of product.

As aforementioned, each of the freezing tanks 10, 11, 12, 13 and 14 comprise three cold wall cylinders, such as illustrated in FIGURE 2. Each tank is provided with a temperature controller 94 which is preset at the temperature desired for the freezing tank. Entry of refrigerating brine from line 83 to each of the freezing tanks is regulated by the temperature controller 94 which is electrically connected to operate valve 87 to admit or shut-off refrigerating brine to the cold wall freezing cylinder 25 arranged in each freezing tank.

Inasmuch as the freezing temperature in each of the tanks are controlled in the same manner, a description of the control action with respect to tank 10 will be understood to apply to the other tanks.

FIGURE 2 of the drawings illustrates a typical temperature control mechanism for a freezing tank, brine being supplied from tank 80 through line 83 at a temperature equivalent to the lowest temperature tank 14, or usually at about −10° F.

For controlling the freezing in tank 10, for example, the temperature controller 94 is set at 25° F. When the −10° F. brine, entering the freezing cylinders 25 (FIGURE 2) through line 85 from line 83, with valve 87 normally open, and contacts the thermometer bulb 90, it actuates the controller 94 which closes valve 87 (valve 100, tank 10). The by-pass valve 96 is operated in conjunction with the controller means 94 so as to allow a trickle of brine to pass to maintain circulation for the thermometer bulb and thus keep the temperature in the freezing cylinders at approximately 25° F. The cold-wall freezing cylinders 25 in the tank when thus connected to line 83 through valve 87 are filled with brine at −10° F. Brine thus at this temperature extracts heat from the 34° F. orange juice. As this brine warms up by taking the heat from the juice and reaches 25° or over, the thermometer bulb 90 again actuates controller 94 to open valve 87, allowing a further supply of cold brine to enter the cold wall cylinders to extract more heat from the juice.

This continues in this manner intermittently until the juice and ice mixture have attained a temperature of approximately 25° F. (or 26° F.), with the controller 94 set at 25° F.; then no more cold brine can enter unless, by radiation, the temperature of the system rises. Then enough brine enters to correct this. The system is thus in temperature equilibrium at 25° F. The liquid juice is of such concentration that its freezing point is 25° F. so no further ice is formed. The cold-wall freezing cylinders 25 are maintained, by the controller, at approximately 25° F. and equilibrium exists.

The juice has been held under these conditions for periods of one hour without forming additional ice. As soon as the temperature setting is altered (at controller 94), this conditions is then upset and more ice forms, or ice melts depending on which way it is moved, to form a new equilibrium point.

Assuming juice entering at 12° Brix, the equilibrium point at 25° F. is about 18° Brix to 20° Brix. It has been observed in experimental runs that the initial Brix of juice entering makes very little difference, except that if it was lower a greater volume of ice would be formed. Also the temperature of the juice entering makes no differences except for time factor. An entering temperature of 75° F. takes longer to attain equilibrium than when the juice enters at 34° F.

It has been found that a 7° F. differential between the old freezing point and the new freezing point in each tank is about the maximum to give the proper kind of ice crystals. If a very wide differential is set up freezing occurs much faster but would occlude juice in the ice and aggregate the crystals.

While the above description and illustration has been directed principally to the treatment of fruit juices, it will be understood that other liquids containing solids and which are sensitive to heat treatment, can be efficiently dehydrated to form a concentrate by the method of this invention. It will also be understood that the following claims comprehend various changes in the temperature of the system, mechanism, speed of stirring and procedure, depending upon the materials being processed.

What is claimed is—

1. An apparatus for dehydrating a heat sensitive liquid composition of relatively low solids content comprising a plurality of interconnected refrigerating tanks for receiving said liquid composition, said tanks including elongated stationary freezing cylinders spacedly arranged therein, said cylinders comprising a hollow outer shell wall for the passage of refrigerant, a central passageway for refrigerant communicating with said hollow outer shell, a pipe line for connecting said central passageway of one of said freezing cylinders with a source of refrigerant, conduit means for connecting said freezing cylinders of each tank in series for the passage of refrigerant through said cylinders and to a discharge line connected to the last freezing cylinder of said series, electrically operated valve means disposed in said pipe line for alternately admitting and restricting the passage of refrigerant to said freezing cylinders and through said hollow shell walls, means operable in response to temperature changes of the refrigerant in the freezing cylinders for actuating said valve, said last-mentioned means including a thermometer bulb disposed in said discharge line of the last freezing cylinder, means for introducing the liquid composition to be dehydrated into said refrigerating tanks, electrically operated valve means operatively connected to each tank for discharging the refrigerated mixture to a centrifuge, and means comprising a common header arranged above and discharging into said centrifuge for collecting said refrigerated mixture discharged from said plurality of tanks.

2. An apparatus for dehydrating a heat sensitive liquid composition of relatively low solids content comprising a plurality of interconnected refrigerating tanks, said tanks including elongated stationary freezing cylinders arranged therein, said freezing cylinders comprising a hollow outer shell wall for the passage of refrigerant, said freezing cylinders comprising spiral baffles arranged in said hollow shell walls, a pipe line for connecting one of said freezing cylinders with a source of refrigerant, conduit means for connecting said freezing cylinder of each tank in series for the passage of refrigerant through the cylinder, electrically operated valve means disposed in said pipe line for alternately admitting and restricting the passage of refrigerant to said freezing cylinders and through said hollow shell walls to a discharge line connected to the last freezing cylinder of said series, means operable in response to temperature changes of the refrigerant in the freezing cylinders for actuating said valve means for introducing the liquid composition to be dehydrated into said refrigeration tanks, said last-mentioned means including a thermometer bulb disposed in said discharge line of the last freezing cylinder, electrically operated valve means operatively connected to each tank for discharging the refrigerated mixture to a centrifuge, and means comprising a common header which communicates with said centrifuge for collecting said refrigerated mixture discharged from said plurality of tanks.

3. An apparatus for dehydrating a heat sensitive liquid composition of relatively low solids content comprising a plurality of interconnected refrigerating tanks, said tanks including elongated stationary freezing cylinders spacedly arranged therein, said cylinders comprising a hollow outer shell wall for the passage of refrigerant, a pipe line connecting said freezing cylinders hollow outer shell with a source of refrigerant, conduit means for connecting said freezing cylinders of each tank in series for the passage of refrigerant through the cylinders, passageway means for introducing refrigerant to the bottom hollow shell wall of said cylinders, electrically operated valve means in said pipe line for alternately admitting and restricting the passage of refrigerant to said freezing cylinders to a discharge line connected to the last freezing cylinder of said series, means operable in response to temperature changes of the refrigerant in the freezing cylinders for actuating said valve, said last mentioned means comprising in combination an adjustable thermostat and thermometer bulb disposed in said discharge line of the last freezing cylinder which is operatively connected to said electrically operated valve for controlling the flow of refrigerant to said freezing cylinders, means for introducing the liquid composition to be dehydrated into said freezing tanks, a centrifuge arranged below said tanks, means for discharging the refrigerated mixture from said tanks into said centrifuge, means comprising a common header which communicates with said centrifuge, for collecting said refrigerated mixture from said plurality of tanks for discharging the same into said centrifuge.

4. An apparatus for dehydrating a heat sensitive liquid composition of relatively low solids content comprising a plurality of interconnected refrigerating tanks, said tanks including elongated stationary freezing cylinders having a hollow outer shell wall for the passage of refrigerant, a pipe line for connecting said freezing cylinder hollow shell with a source of refrigerant, conduit means for connecting said freezing cylinders of each tank in series for the passage of refrigerant through the cylinder, electrically operated valve disposed in said pipe line for alternately admitting and restricting the passage of refrigerant to said freezing cylinders and through said hollow shell walls to a discharge line connected to the last freezing cylinder of said series, means operable in response to temperature changes of the refrigerant in the freezing cylinders for actuating said valve means for introducing the liquid composition to be dehydrated into said refrigerating tanks, said last mentioned means including a thermometer bulb disposed in said discharge line of the last freezing cylinder, a centrifuge arranged below said tanks, means for discharging the refrigerated mixture to a centrifuge, and means comprising a common header which communicates with said centrifuge for collecting said refrigerated mixture from said plurality of tanks, said means for connecting said freezing cylinder in series comprising means for connecting the discharge side of one freezing cylinder to the inlet of said next freezing cylinder and from a discharge opening to a return conduit whereby refrigerant flows into said first freezing cylinder and then into the next succeeding freezing cylinder and to a discharge line connected with the return conduit.

5. An apparatus for dehydrating a heat sensitive liquid composition of relatively low solids content comprising a plurality of interconnected refrigerating tanks for receiving said liquid composition, said tanks including elongated stationary freezing cylinders spacedly arranged therein, said cylinders comprising a hollow outer shell wall for the passage of refrigerant, a central fluid passageway communicating with said hollow outer shell, pipe line connecting said central passageway of said freezing cylinder with a source of refrigerant, conduit means for connecting said freezing cylinders of each tank in series for the passage of refrigerant through the cylinders, electrically operated valve means disposed in said conduit which is actuated automatically for alternately admitting and restricting the passage of refrigerant to said freezing cylinders and for circulating through said hollow shell walls to a discharge line connected to the last freezing cylinder of said series, means operable in response to temperature changes of the refrigerant in the freezing cylinders for actuating said valve, said last mentioned means including a thermometer bulb disposed in said discharge line of the last freezing cylinder of said series, means for introducing the liquid composition to be dehydrated into said refrigerating tanks, electrically operated valve means operatively connected to each tank for discharging the refrigerated mixture to a centrifuge, and means comprising a common header which communicates with said centrifuge for collecting said refrigerated mixture discharged from said plurality of tanks.

References Cited in the file of this patent

UNITED STATES PATENTS

| | | |
|---|---|---|
| 2,140,744 | Hirsch | Dec. 20, 1938 |
| 2,346,469 | Carter | Apr. 11, 1944 |
| 2,764,880 | Wenzelberger | Oct. 2, 1956 |
| 2,800,001 | Wenzelberger | July 23, 1957 |